United States Patent
Sinha et al.

(10) Patent No.: US 7,543,456 B2
(45) Date of Patent: Jun. 9, 2009

(54) HEAT PUMP LIQUID HEATER

(75) Inventors: Sunil Kumar Sinha, Katy, TX (US); Asoke Deysarkar, Houston, TX (US)

(73) Assignee: Airgenerate LLC, Houston, TX (US)

( * ) Notice: Subject to any disclaimer, the term of this patent is extended or adjusted under 35 U.S.C. 154(b) by 246 days.

(21) Appl. No.: 11/477,902

(22) Filed: Jun. 30, 2006

(65) Prior Publication Data

US 2008/0000247 A1 Jan. 3, 2008

(51) Int. Cl.
F25B 27/00 (2006.01)

(52) U.S. Cl. .................................. 62/238.6; 285/139.1

(58) Field of Classification Search ..... 62/238.6–238.7, 62/235.1, 513; 285/139.1, 139.3, 141.1, 285/142.1, 143.1
See application file for complete search history.

(56) References Cited

U.S. PATENT DOCUMENTS

| | | | | |
|---|---|---|---|---|
| 2,440,372 | A * | 4/1948 | Wilbur .................... | 285/143.1 |
| 4,015,962 | A * | 4/1977 | Tompkins .................... | 62/175 |
| 4,103,509 | A | 8/1978 | Bottum | |
| 4,173,872 | A * | 11/1979 | Amthor, Jr. ................ | 62/238.6 |
| 4,255,936 | A | 3/1981 | Cochran | |
| 4,290,275 | A | 9/1981 | Disco et al. | |
| 4,293,323 | A * | 10/1981 | Cohen ....................... | 62/238.6 |
| 4,299,098 | A | 11/1981 | Derosier | |
| 4,320,630 | A | 3/1982 | Uselton et al. | |
| 4,330,309 | A | 5/1982 | Robinson, Jr. | |
| 4,366,677 | A | 1/1983 | Uselton | |
| 4,399,664 | A | 8/1983 | Derosier | |
| 4,404,958 | A | 9/1983 | Boettcher | |
| 4,492,091 | A | 1/1985 | Whitwell et al. | |
| 4,498,622 | A | 2/1985 | Harnish | |
| 4,517,807 | A | 5/1985 | Harnish | |
| 4,540,874 | A | 9/1985 | Shaffer, Jr. et al. | |
| 4,598,557 | A | 7/1986 | Robinson et al. | |
| 4,665,712 | A | 5/1987 | Gehring et al. | |
| 4,929,001 | A * | 5/1990 | Phillips, II ................ | 285/141.1 |
| 5,052,187 | A * | 10/1991 | Robinson, Jr. .................. | 62/79 |
| 5,213,378 | A * | 5/1993 | MacGregor .............. | 285/141.1 |
| 5,255,338 | A | 10/1993 | Robinson, Jr. et al. | |
| 5,348,037 | A * | 9/1994 | Katchka ................... | 137/15.17 |
| 5,495,551 | A | 2/1996 | Robinson, Jr. et al. | |
| 5,573,182 | A | 11/1996 | Gannaway et al. | |
| 5,906,109 | A | 5/1999 | Dieckmann et al. | |
| 5,946,927 | A | 9/1999 | Dieckmann et al. | |
| 6,173,997 | B1 * | 1/2001 | Nordstrom et al. ....... | 285/139.1 |
| 6,212,894 | B1 | 4/2001 | Brown et al. | |
| 6,233,958 | B1 | 5/2001 | Mei et al. | |

(Continued)

Primary Examiner—William E Tapolcai
(74) Attorney, Agent, or Firm—Trop, Pruner & Hu, P.C.

(57) ABSTRACT

A heat pump liquid heater for heating a liquid comprising: a heat pump; a liquid tank in heat communication with the heat pump, wherein the liquid tank comprises the liquid; and at least one metal condenser tube immersed into the liquid, wherein the metal condenser tube forms at least one coil. The metal condenser tube has a flattened double-tube configuration and a cross-section defined by concentric ovals such that at least a portion of the concentric ovals is in contact with one another thereby minimizing space between the flattened double-tubes. The heat pump comprises a tube-in-tube heat exchanger and a compressor, wherein the tube-in-tube heat exchanger recovers heat from refrigerant returning from the liquid tank and transfers the recovered heat to refrigerant going to the compressor thereby superheating the refrigerant.

24 Claims, 7 Drawing Sheets

U.S. PATENT DOCUMENTS

| | | |
|---|---|---|
| 6,430,949 B2 | 8/2002 | Noro et al. |
| 6,467,288 B2 | 10/2002 | Kuroki et al. |
| 6,733,045 B2 * | 5/2004 | Harrington et al. ..... 285/148.19 |
| 6,908,117 B1 * | 6/2005 | Pickett et al. .......... 285/137.11 |
| 6,913,067 B2 * | 7/2005 | Hesse ......................... 165/43 |
| 2001/0032475 A1 | 10/2001 | Chen et al. |
| 2001/0048031 A1 | 12/2001 | Noro et al. |
| 2002/0000094 A1 | 1/2002 | Kuroki et al. |
| 2004/0144528 A1 | 7/2004 | Kunimoto et al. |
| 2005/0069423 A1 | 3/2005 | Ebara et al. |
| 2005/0120729 A1 | 6/2005 | Zhang et al. |
| 2005/0150969 A1 | 7/2005 | Nakayama et al. |
| 2005/0155364 A1 | 7/2005 | Concha et al. |
| 2005/0189431 A1 | 9/2005 | Nakayama et al. |

* cited by examiner

SUPPLYING SOLAR ENERGY TO A HEAT PUMP LIQUID HEATER

HEAT PUMP LIQUID HEATER

FIELD OF THE INVENTION

The present invention is related to heat pump liquid heating systems and methods of heating a liquid.

BACKGROUND OF THE INVENTION

A Heat Pump Liquid Heater ("HPLH") uses a refrigeration system to extract heat from the surrounding environment to heat a liquid. An HPLH system typically consumes less than half the energy relative to a conventional, electric-resistance or gas burner liquid heater. An HPLH system is based on a reverse refrigeration cycle with the HPLH system using an electrical compressor to compress the refrigerant to a liquid state which is at a high pressure and temperature. The refrigerant at high temperature and pressure transfers heat to a liquid and then goes though an expansion process where the temperature and pressure of the refrigerant are reduced to form a low temperature refrigerant. The low temperature refrigerant passes through an evaporator absorbing heat from the surrounding air and converts into a gaseous state. The gaseous refrigerant is re-compressed in the compressor and the aforementioned process continues. The liquid is heated by both the heat transferred from the ambient air and the electricity used to operate the compressor making HPLH more than 100% efficient.

There are basic two types of HPLH systems described in the references: (i) integrated with a liquid tank, and (ii) a standalone without a liquid tank. In both types of systems, the condenser coil is either immersed into the liquid in the tank where a pump is not required or the liquid is pumped from the tank to the heat pump condenser coil. HPLH systems are attached with backup heating system like electrical elements or gas heaters if the HPLH system fails, has reduced performance levels, or if the demand for hot liquid surpasses the capacity of the HPLH system.

An HPLH system with a liquid pump adds to costs, complexity, and maintenance. It also reduces efficiency because pumps need additional electrical energy to run. An integrated HPLH system with a tank is limited to serve only new constructions or to replace old water heater tanks. There are a few references of standalone HPLH systems without using liquid pumps (see, for example, U.S. Pat. Nos. 5,946,927 and 6,233, 958). U.S. Pat. No. 5,946,927 discloses a condenser coil rapped around the water tank on the outside for heat transfer to the liquid inside the tank. Such a system has a high cost of manufacturing and reduces the efficiency of heat transfer from the condenser coil to the liquid because the condenser coil is not in direct contact with the liquid.

U.S. Pat. No. 6,233,958 describes a standalone heat pump water heater for residential use with a condenser assembly having a tube-in-tube cylinder configuration such that an outer cylinder carries a superheated refrigerant and an inner cylinder returns the refrigerant to an expansion process. The condenser assembly is inserted into the water tank though an existing opening in the top of the tank. As the refrigerant condenses along the interior surface of the outer cylinder, the heat from the refrigerant is transferred to the water. This heat pump water heater has a limitation of heat transfer to the water because of the limited surface area provided by the cylindrical condenser exposed to the water. The limited heat transfer reduces the efficiency of the system. The diameter of the outer cylinder should be smaller than the size of the opening in the tank. The typical size of the opening in residential water tanks is about ¾ inches and the height of tank is typically about 3-5 ft. Therefore, the maximum heat transfer area is limited by these dimensions. Another limitation of the heat pump water heater is the reduction in efficiency due to heating the returning refrigerant by entering hot refrigerant. The heat gained in the return refrigerant is wasted. Such a heat pump water heater is typically suited for a low capacity compressor but will significantly reduce the efficiency of a typical residential heat pump water heater.

Therefore, there is a need for efficient HPLH systems where liquids such as water can be heated in a shorter period of time while reducing the amount of energy used to heat the liquid. Further, there is a need for HPLH systems that can be easily installed or easily retrofitted onto preexisting liquid tanks while providing reduced heating times along with reduced power consumption. There is also a need for HPLH systems with increased efficiencies that further provide reduced costs related to materials and installation of the HPLH systems.

SUMMARY OF THE INVENTION

In accordance with the foregoing objectives, provided is a heat pump liquid heater for heating a liquid comprising: a heat pump; a liquid tank in heat communication with the heat pump, wherein the liquid tank comprises the liquid; and at least one metal condenser tube immersed into the liquid, and wherein the metal condenser tube forms at least one coil.

In a second embodiment, a method of heating a liquid is disclosed. The method of heating the liquid comprises supplying hot refrigerant from a heat pump liquid heater via at least one metal condenser tube; transferring heat from the hot refrigerant to the liquid in a liquid tank such that the liquid is heated to a predetermined temperature controlled by a thermostat, and wherein the metal condenser tube forms at least one coil.

In a third embodiment, a heat pump liquid heater for heating a liquid is disclosed. The HPLH comprises a heat pump; a liquid tank in heat communication with the heat pump, wherein the liquid tank comprises the liquid; and at least one metal condenser tube immersed into the liquid, wherein the metal condenser tube comprises a refrigerant and is connected to the heat pump, and wherein the metal condenser tube is immersed into the liquid via an adaptor assembly, wherein the adaptor assembly comprises: a metal nipple fixedly attached to an opening in a liquid tank; a metal union fixedly attached onto the metal nipple; and a metal tube fixedly attached to the metal union, wherein the metal tube is adapted to receive at least one condenser tube and/or a thermostat bulb.

In another embodiment, a heat pump liquid heater for heating a liquid is disclosed. The HPLH comprises a heat pump; a liquid tank in heat communication with the heat pump, wherein the liquid tank comprises the liquid; at least one metal condenser tube immersed into the liquid, wherein the metal condenser tube comprises a refrigerant; and a tube-in-tube heat exchanger in fluid communication with a compressor, wherein the tube-in-tube heat exchanger recovers heat from refrigerant returning from the liquid tank and transfers the recovered heat to refrigerant going to the compressor thereby superheating the refrigerant.

In another embodiment, an adaptor assembly is disclosed. The adaptor assembly comprises a metal nipple fixedly attached to an opening in a liquid tank; a metal union fixedly attached onto the metal nipple; and a metal tube fixedly attached to the metal union, wherein the metal tube is adapted to receive at least one condenser tube and/or a thermostat bulb.

In a most preferred embodiment, the energy sources of the heat pump liquid heater is solar energy.

The following detailed description of embodiments of the invention, taken in conjunction with the accompanying drawings, provide a more complete understanding of the nature and scope of the invention.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION OF THE INVENTION

Definitions

Unless otherwise stated, the following terms used in the specification and claims have the meanings given below:

"Liquid", as used herein, is meant to include water of all grades and types, oils, fuels, gases, and mixtures thereof. In preferred embodiments, the liquid is water, wherein the water can be but is not limited to tap water, hard water, soft water, mineral water, dematerialized water, filtered water, steam-distilled water, salt water, fresh water, distilled water, etc.

"Metal" or "metallic", as used herein, is meant to include any heat conducting metals and/or alloys including but not limited to aluminum, copper, gold, iron, lead, silver, titanium, magnesium, zinc, and various alloys thereof. The "metal" or "metallic" components in the present invention are most preferably copper or alloys of copper.

"Compressor", as used herein, is meant to include any type of motor driven refrigerant compression device.

Various Embodiments of the Invention

The above disadvantages of the prior art are overcome by the present invention wherein the HPLH is a standalone system or a retrofitted systems without a liquid circulating pump and the condenser is a single tube loop or multiple tube loops immersed in a liquid tank.

According to a first embodiment of the present invention, a heat pump liquid heater for heating a liquid is disclosed. The HPLH comprises a heat pump; a liquid tank in heat communication with the heat pump, wherein the liquid tank comprises the liquid; and at least one metal condenser tube immersed into the liquid, and wherein the metal condenser tube forms at least one coil.

In a preferred embodiment, the metal condenser tube has a flattened double-tube configuration and a cross-section defined by concentric ovals such that at least a portion of the concentric ovals is in contact with one another thereby minimizing space between the flattened double-tubes.

The metal condenser tube is connected to the heat pump and is immersed into the liquid via an adaptor assembly. The adaptor assembly is fixedly attached to the liquid tank. The adaptor assembly connects the heat pump and the liquid tank.

The metal condenser tube is a single continuous coiled tube. The metal condenser tube has a length of from about 1 ft to about 250 ft, and more preferably the metal condenser tube has a length of from about 10 ft to about 100 ft. The metal condenser tube has a diameter of from about 0.01 inches to about 0.50 inches, and more preferably the metal condenser tube has a diameter of about 3/16 inches. The metal condenser tube has a thickness of about 0.035 inches. The metal condenser tube is preferably made of copper.

The metal condenser tube is flexible. The metal condenser tube has a length and diameter to heat the liquid to a predetermined temperature in a predetermined time period. The metal condenser tube has a surface area to heat the liquid to a predetermined temperature in a predetermined time period. The metal condenser tube can have a whisk configuration with multiple smaller diameter condenser tubes emerging from the metal condenser tube, wherein the smaller diameter condenser tubes form coils.

In another preferred embodiment, the heat pump comprises a tube-in-tube heat exchanger and a compressor, wherein the tube-in-tube heat exchanger recovers heat from refrigerant returning from the liquid tank and transfers the recovered heat to refrigerant going to the compressor thereby superheating the refrigerant. The compressor is powered by a solar energy source and/or a traditional electric source.

The HPLH further comprises a thermostat with a knob, wherein the knob is adjusted by a user to obtain a predetermined temperature of the liquid. The liquid in the liquid tank is water.

According to a second embodiment of the present invention, a method of heating a liquid is disclosed. The method of heating the liquid comprises supplying hot refrigerant from a heat pump liquid heater via at least one metal condenser tube; transferring heat from the hot refrigerant to the liquid in a liquid tank such that the liquid is heated to a predetermined temperature controlled by a thermostat, and wherein the metal condenser tube forms at least one coil.

In a preferred embodiment, the metal condenser tube has a flattened double-tube configuration and a cross-section defined by concentric ovals such that at least a portion of the concentric ovals is contact with one another thereby minimizing space between the flattened double-tubes. The heat pump comprises a tube-in-tube heat exchanger and a compressor, wherein the tube-in-tube heat exchanger recovers heat from refrigerant returning from the liquid tank and transfers the recovered heat to refrigerant going to the compressor thereby superheating the refrigerant. The compressor is powered by a solar energy source and/or a traditional electric source. The heat pump further comprises a thermostat with a knob, wherein the knob is adjusted by a user to obtain a predetermined temperature of the liquid.

The metal condenser tube is a single continuous coiled tube. The metal condenser tube has a length of from about 1 ft to about 250 ft, and more preferably the metal condenser tube has a length of from about 10 ft to about 100 ft. The metal condenser tube has a diameter of from about 0.01 inches to about 0.50 inches, and more preferably the metal condenser tube has a diameter of about 3/16 inches. The metal condenser tube has a thickness of about 0.035 inches. The metal condenser tube is flexible. The metal condenser tube has a length and diameter to heat the liquid to a predetermined temperature in a predetermined time period. The metal condenser tube has a surface area to heat the liquid to a predetermined temperature in a predetermined time period. The metal condenser tube has a whisk configuration with multiple smaller diameter condenser tubes emerging from the metal condenser tube, wherein the smaller diameter condenser tubes form coils. The metal tube is preferably made of copper or an alloy of copper. The refrigerant is selected from the group consisting of carbon dioxide, hydrofluorocarbons, and hydrochlorofluorocarbons. The liquid in the liquid tank is water.

According to a third embodiment, a heat pump liquid heater for heating a liquid is disclosed. The HPLH comprises a heat pump; a liquid tank in heat communication with the heat pump, wherein the liquid tank comprises the liquid; and at least one metal condenser tube immersed into the liquid, wherein the metal condenser tube comprises a refrigerant and is connected to the heat pump, and wherein the metal condenser tube is immersed into the liquid via an adaptor assembly, wherein the adaptor assembly comprises: a metal nipple fixedly attached to an opening in a liquid tank; a metal union fixedly attached onto the metal nipple; and a metal tube fixedly attached to the metal union, wherein the metal tube is adapted to receive at least one condenser tube and/or a thermostat bulb.

In a preferred embodiment, the metal condenser tube has a flattened double-tube configuration and a cross-section defined by concentric ovals such that at least a portion of the concentric ovals is in contact with one another thereby minimizing space between the flattened double-tubes. The adaptor assembly is retrofitted onto a preexisting liquid tank and/or air conditioning unit thereby forming a substantially air tight and water tight connection between the heat pump and the preexisting liquid tank and/or air conditioning unit.

The heat pump comprises a tube-in-tube heat exchanger and a compressor, wherein the tube-in-tube heat exchanger recovers heat from refrigerant returning from the liquid tank and transfers the recovered heat to refrigerant going to the compressor thereby superheating the refrigerant.

In another preferred embodiment, the compressor is powered by a solar energy source and/or a traditional electric source. The power collected by the solar photovoltaic panel is DC electricity which is stored in at least one rechargeable battery via a charge controller so as to supply DC electricity on demand from the at least one battery to the heat pump liquid heater.

In another preferred embodiment, the power collected by the solar photovoltaic panel is DC electricity which is stored in at least one rechargeable battery via a charge controller so as to convert the DC electricity into AC electricity via an inverter and then supply the AC electricity on demand to the heat pump liquid heater. The heat pump further comprises a thermostat with a knob, wherein the knob is adjusted by a user to obtain a predetermined temperature of the liquid.

The metal condenser tube is a single continuous coiled tube. The metal condenser tube has a length of from about 1 ft to about 250 ft, and more preferably the metal condenser tube has a length of from about 10 ft to about 100 ft. The metal condenser tube has a diameter of from about 0.01 inches to about 0.50 inches, and more preferably the metal condenser tube has a diameter of about 3/16 inches. The metal condenser tube has a thickness of about 0.035 inches. The metal condenser tube is preferably made of copper. The metal condenser tube is flexible. The metal condenser tube has a length and diameter to heat the liquid to a predetermined temperature in a predetermined time period. The metal condenser tube has a surface area to heat the liquid to a predetermined temperature in a predetermined time period. The metal condenser tube has a whisk configuration with multiple smaller diameter condenser tubes emerging from the metal condenser tube, wherein the smaller diameter condenser tubes form coils.

The refrigerant can be any refrigerant used in traditional air conditioning and/or heat pump systems. Exemplary refrigerants include carbon dioxide, hydrofluorocarbons, and hydrochlorofluorocarbons. Other examples of refrigerants include chlorodifluoromethane (sold as R-22), chloropentafluoroethane (sold as R-502), dichlorodifluoromethane (sold as R-12), trichlorofluoromethane (sold as R-11), trichlorotrifluoroethane (sold as R-113), tetrafluoroethane (sold as R-134a), and dichlorotrifluoroethane (sold as R-123). In a most preferred embodiment, the refrigerant is carbon dioxide. The liquid in the liquid tank is preferably water.

According to a fourth embodiment of the present invention, a heat pump liquid heater for heating a liquid is disclosed. The HPLH comprises a heat pump; a liquid tank in heat communication with the heat pump, wherein the liquid tank comprises the liquid; at least one metal condenser tube immersed into the liquid, wherein the metal condenser tube comprises a refrigerant; and a tube-in-tube heat exchanger in fluid communication with a compressor, wherein the tube-in-tube heat exchanger recovers heat from refrigerant returning from the liquid tank and transfers the recovered heat to refrigerant going to the compressor thereby superheating the refrigerant.

The heat pump comprises a compressor, and wherein the tube-in-tube heat exchanger recovers heat from refrigerant returning from the liquid tank and transfers the recovered heat to refrigerant going to the compressor thereby superheating the refrigerant.

According to a fifth embodiment, an adaptor assembly is disclosed. The adaptor assembly comprises a metal nipple fixedly attached to an opening in a liquid tank; a metal union fixedly attached onto the metal nipple; and a metal tube fixedly attached to the metal union, wherein the metal tube is adapted to receive at least one condenser tube and/or a thermostat bulb.

The attachment between the metal nipple and the opening in the liquid tank is substantially air tight. A commercial small-scale or large-scale air conditioning unit comprises the liquid tank thereby forming a retrofitted attachment between the metal nipple and the opening in the liquid tank.

Figure 1:
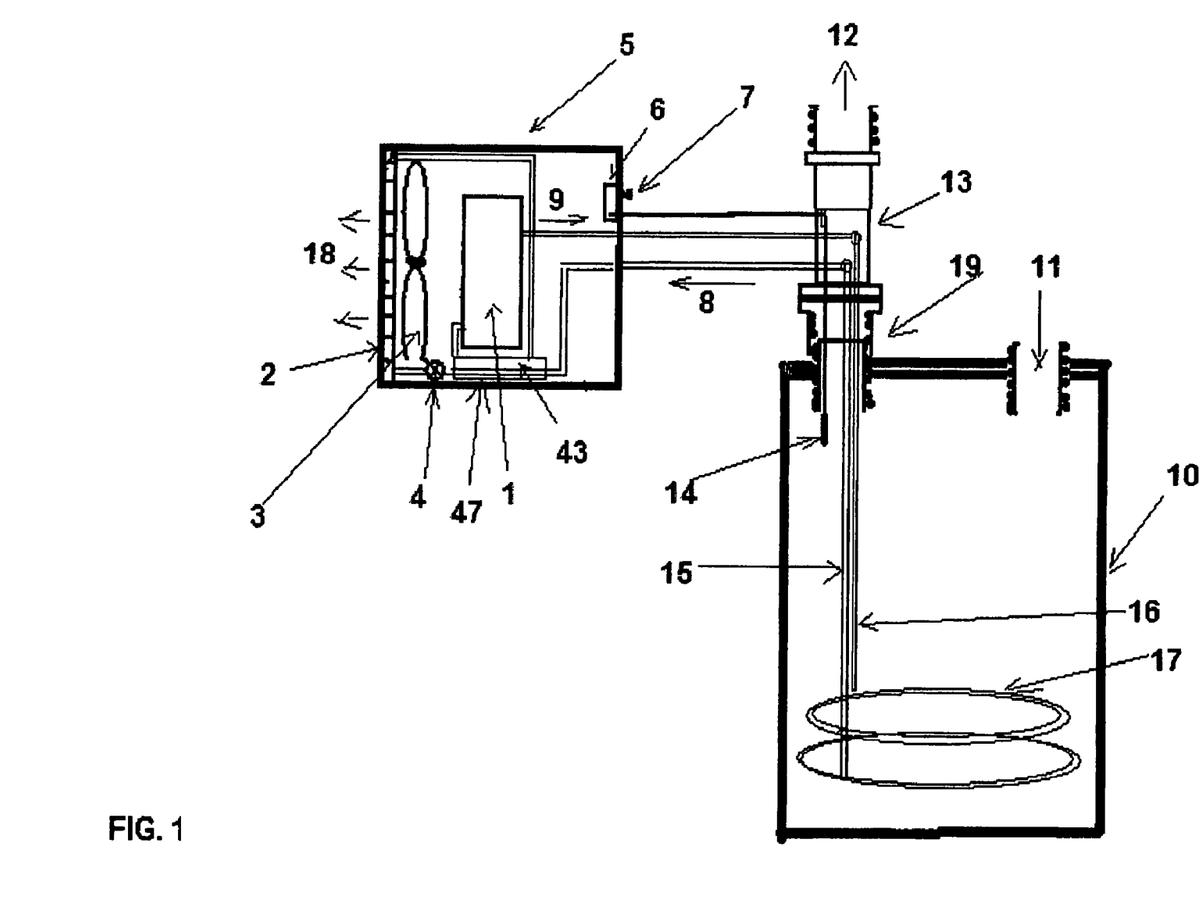
FIG. 1 illustrates a schematic diagram of an HPLH including an adaptor and a heat pump.

Turning now to the drawings, FIG. 1 illustrates a schematic diagram of a heat pump water heating system according to one embodiment of the invention. The heat pump water heating system includes a heat pump 5 having a compressor 1, an evaporator 2 with a fan 3, an expansion device 4, a thermostat controller 6, and a thermostat knob 7.

Compressed refrigerant 9 exits the compressor 1 at a temperature controlled via the thermostat controller 6 when a user adjusts a thermostat knob 7. The compressed refrigerant 9 exits the compressor 1 at a high pressure and a high enthalpy. The refrigerant then flows into the liquid tank 10 at a high pressure via a single coiled condenser tube 16. A liquid such as water 11 flows into the liquid tank 10 and exchanges heat with the compressed refrigerant 9 flowing through the single coiled condenser tube 16, which is immersed into the liquid in the liquid tank 10. In the liquid tank 10, the compressed refrigerant 9 transfers heat into the liquid, and the refrigerant exits the liquid tank 10 via the returning single coiled condenser tube 15 as cooled refrigerant 8. The cooled refrigerant 8 is at a low enthalpy and a high pressure. The coiled condenser tubes 15 and 16 form a coiled bundle 17 which remains immersed in the liquid.

The cold liquid 11 enters the liquid tank 10 and gets heated by superheated refrigerant in the coiled condenser tube generally defined by 15, 16 and 17 in FIG. 1. Hot water 12 exits the liquid tank 10 via an adaptor assembly 13 fixedly attached to the opening in the liquid tank 10 by a union 19 (see FIG. 2 for more description on the adaptor assembly 13). Most of the heat transfer from the single coiled condenser tube occurs towards the bottom of the liquid tank 10 wherein cold liquid tends to settle towards the bottom as heated liquid tends to rise towards the top of the liquid tank 10 providing a more homogenized liquid temperature in the liquid tank 10 compared to similar conventional HPLH systems. This homogenizing process enhances the heating efficiency of the HPLH.

The refrigerant 8 has higher temperature than liquid in the tank and its heat can be recovered before it passes though the expansion process in 4 for better efficiency. The refrigerant 8 passes though a tube-in-tube heat exchanger (also referred to as the economizer) 47 (shown in FIG. 4) where the heat from the returning refrigerant 8 is transferred to the refrigerant 43 (shown in FIG. 4) and passed to the compressor.

Figure 2:
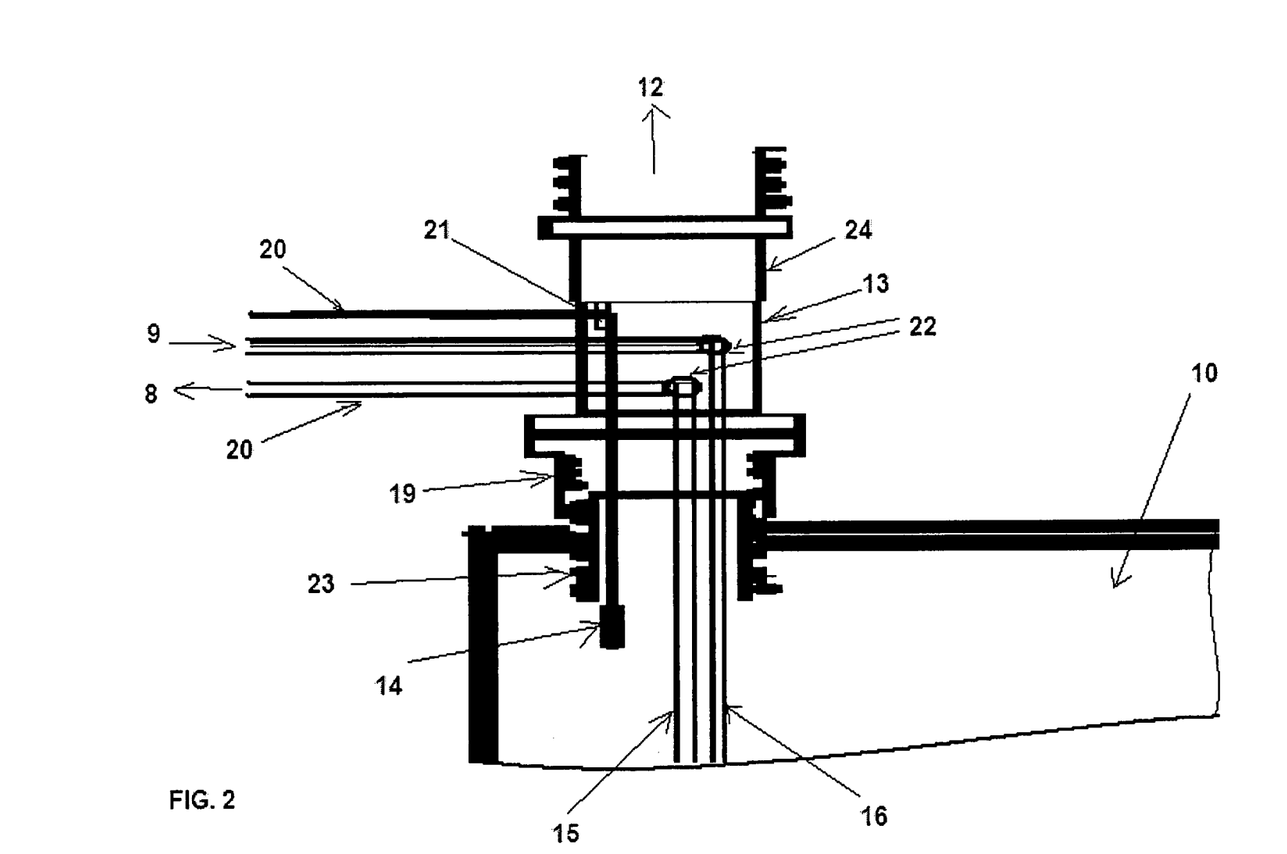
FIG. 2 illustrates an exploded view of the adaptor schematic shown in FIG. 1.

FIG. 2 illustrates an exploded view of the adaptor assembly 13 shown in FIG. 1. The adaptor assembly 13 is a pipe fitting which connects the heat pump 5 and the liquid tank 10. The adaptor assembly 13 also facilitates flow of liquid 12 exiting the liquid tank 10. The adaptor assembly 13 also facilitates refrigerant flow via the coiled condenser tubes 15 and 16. Moreover, the adaptor assembly 13 facilitates the attachment of a thermostat immersion bulb 14 (also shown in FIG. 1) such that the bulb can be immersed into the liquid in the liquid tank 10 for accurate and efficient monitoring of the liquid temperature.

The adaptor assembly 13 is fixedly attached by thread fitting a metal nipple 23 to a threaded hole in the liquid tank 10. A metal union 19 is thread fitted on the nipple 23. A metal tube 13 is either thread fitted or compression fitted to the union 19 depending on the type of union. The metal tube 13 has two holes 22 through which the coiled condenser tubes 15 and 16 can pass. An air tight weld is formed at the two holes 22 making the adaptor assembly substantially air tight. A tube 13 has an open notch 21 at one end.

The thermocouple capillary tube 20 having the thermostat bulb 14 is inserted through the notch 21. As the thermostat bulb 14 is usually substantially large and cannot bend, the notch 21 aids in the insertion of the thermostat bulb into the liquid tank 10. A metal pipe fitting with female solder sup and male thread 24 is connected to the tube 13. The cup of fitting 24 is welded to the tube 13 in such a way that the notch 21 is sealed. The adaptor assembly 13 enhances the efficiency of the HPLH system by accommodating the coiled condenser tubes and the thermostat bulb 14. Moreover, the adaptor assembly 13 including the coiled condenser tubes 15, 16, and 17 and the thermostat bulb 14 can be inserted into the threaded hole in the liquid tank without requiring to move the heat pump 5.

In another embodiment, the thermostat can be a non-immersion type thermostat which is externally mounted on a wall of the liquid tank 10 as in the case of conventional electrical water heater tanks.

Figure 3:
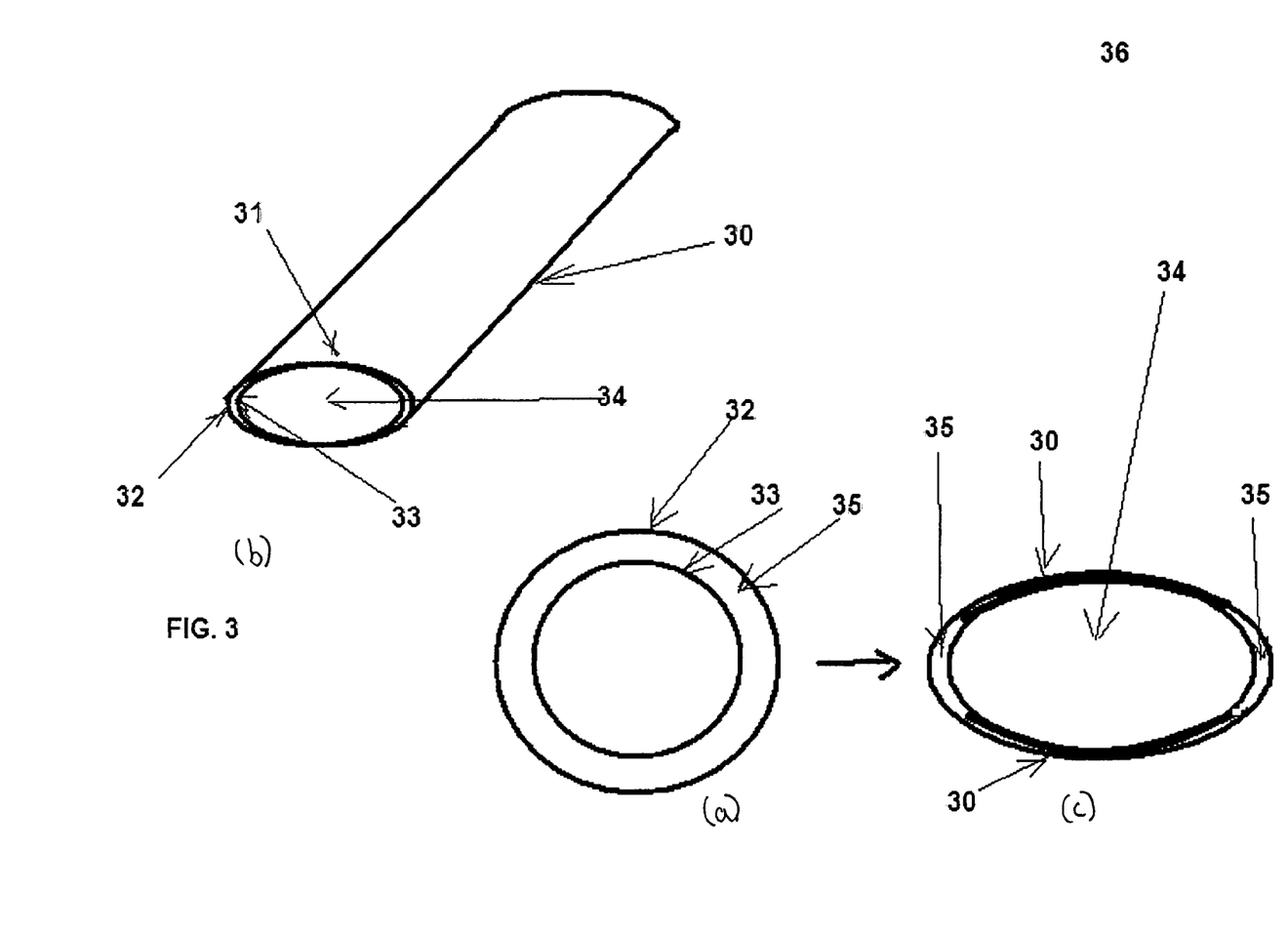
FIG. 3 illustrates a schematic diagram of metal heating tubes.

The coiled condenser tubes 15, 16 and 17 can be made of any metal. In another embodiment, the coiled condenser tubes 15, 16, and 17 can be made of copper or an alloy of copper. The coiled condenser tubes can be made from a single tube forming coils or multiple tubes forming coils. The coiled condenser tubes can each be made of a single wall tube or double walls in order to prevent any contamination of the liquid in the liquid tank 10 with refrigerant due to a rupture in a single tube configuration.

FIG. 3 illustrates a schematic diagram of coiled condenser tubes 15, 16 and 17 for double wall configuration. Double wall condenser tube 15, 16 and 17 may be required for some building code. In a preferred embodiment, the metal tubes 15 and 16 are made of concentric metal tubes so as avoid the contamination of the liquid with the refrigerant. A cross-section of the concentric metal tubes is shown in FIG. 3(a). FIG. 3(a) shows the cross-section of concentric metal tubes, wherein an outer tube 32 envelopes an inner tube 33. A gap 35 is formed between the outer tube 32 and the inner tube 33 such that air is trapped in the gap 35. The air trapped in the gap 35 conducts heat from the inner tube 33 to the outer tube 32. Due to the presence of air in the gap 35 as an intermediary for heat conduction between the inner tube 33 and the outer tube 32, some heat is lost in heating the air in the gap. Further, air is not as good of a conductor of heat as the metal tubes therefore the efficiency of heating the liquid is decreased.

In a more preferred embodiment, the metal tubes 15 and 16 are each made of concentric metal tubes, wherein the concentric metal tubes are shown in FIGS. 3($b$)1 and ($b$)2. FIG. 3($b$)1 shows a flattened tube and FIG. 3($b$)2 shows a cross-section of the flattened tube shown in FIG. 3($b$)1. The cross-section shown in FIG. 3($a$) shows two concentric circles wherein the gap between the two concentric circles is substantially the same throughout the circumference of the two concentric circles. However, the cross-section shown in FIG. 3($b$)2 shows two concentric ovals wherein the gap between the two concentric ovals is such that the gap between the two ovals is substantially minimized while still providing a double tube configuration. The oval double-tube configuration exemplified in FIG. 3($b$)2 not only provides protection against contamination of the liquid with any leaked refrigerant but also conducts heat more efficiently than the double tube configuration shown in FIG. 3($a$) as the amount of air in the gap between the concentric tubes in FIGS. 3($b$)1 and 3($b$)2 is minimized.

The condenser of the HPLH is attached to the liquid tank using an adaptor assembly of the present invention. The adaptor assembly fits into a preexisting hole in the tank cover preferably on a hot liquid outlet. The adaptor assembly can also be fitted onto a hole on a side wall or any other opening on the liquid tank. The bottom of the adaptor assembly is screwed into the hole in the liquid tank and the top of the adaptor assembly is fixedly attached to the hot liquid outlet pipe.

As mentioned above, the condenser is a single continuous tube or multiple loops with a sharp bend at the middle making a loop. The surface area of the condenser tube, which is determined by the length and the diameter of the condenser tube, can be designed to heat the liquid in the liquid tank to a predetermined temperature in a predetermined time period. The two ends of the looped condenser tube along with an immersion thermocouple tube pass through the adaptor assembly and protrude out of the adaptor wall.

Moreover, condenser tube length can be designed to be of any predetermined length depending on the capacity of the compressor. The larger the compressor capacity the longer the length of the condenser tube will be in order to maximize heat transfer from superheated refrigerant to the liquid in the liquid tank. The diameter of the condenser tube is designed to have enough flexibility so that it can be inserted into tank easily. The metal condenser tube has a length and diameter and wall thickness of any dimension. The metal condenser tube has a length and diameter to heat the liquid to a predetermined temperature in a predetermined time period. The metal condenser tube has a surface area to heat the liquid to a predetermined temperature in a predetermined time period.

The condenser tube curls towards the bottom of the liquid tank wherein as liquid at a lower temperature is heated to form hot liquid, the hot liquid rises towards the top of the liquid tank. This process aids in homogenizing the liquid temperature in the liquid tank and improves efficiency of the HPLH.

The condenser tube is coiled so as to form a bundle. The primary purpose of bundling the condenser tube is to aid in easy removal of the condensing tube from the liquid tank and thereby aiding in easy disconnection of the heat pump from the liquid tank. The condenser tube bundle can be tied together at the top for ease in pulling out from the hole of the tank cover. The bundle is scattered towards the bottom of the liquid tank for improved heat transfer by exposing the condenser to a large surface area of the liquid in the liquid tank.

A traditional short length straight or un-coiled condenser tube is difficult to insert into the liquid tank through a hole while holding the HPLH. In contrast, the long bundle of the condenser tubes of the present invention are easy to insert into the liquid tank through a hole in the liquid tank as the HPLH can be placed on any convenient surface while inserting the bundled condenser tube into the liquid tank. Once the bundled condenser tube is inserted into the liquid tank, the HPLH can be placed in any desired position such as on the top of the liquid tank.

Figure 4:
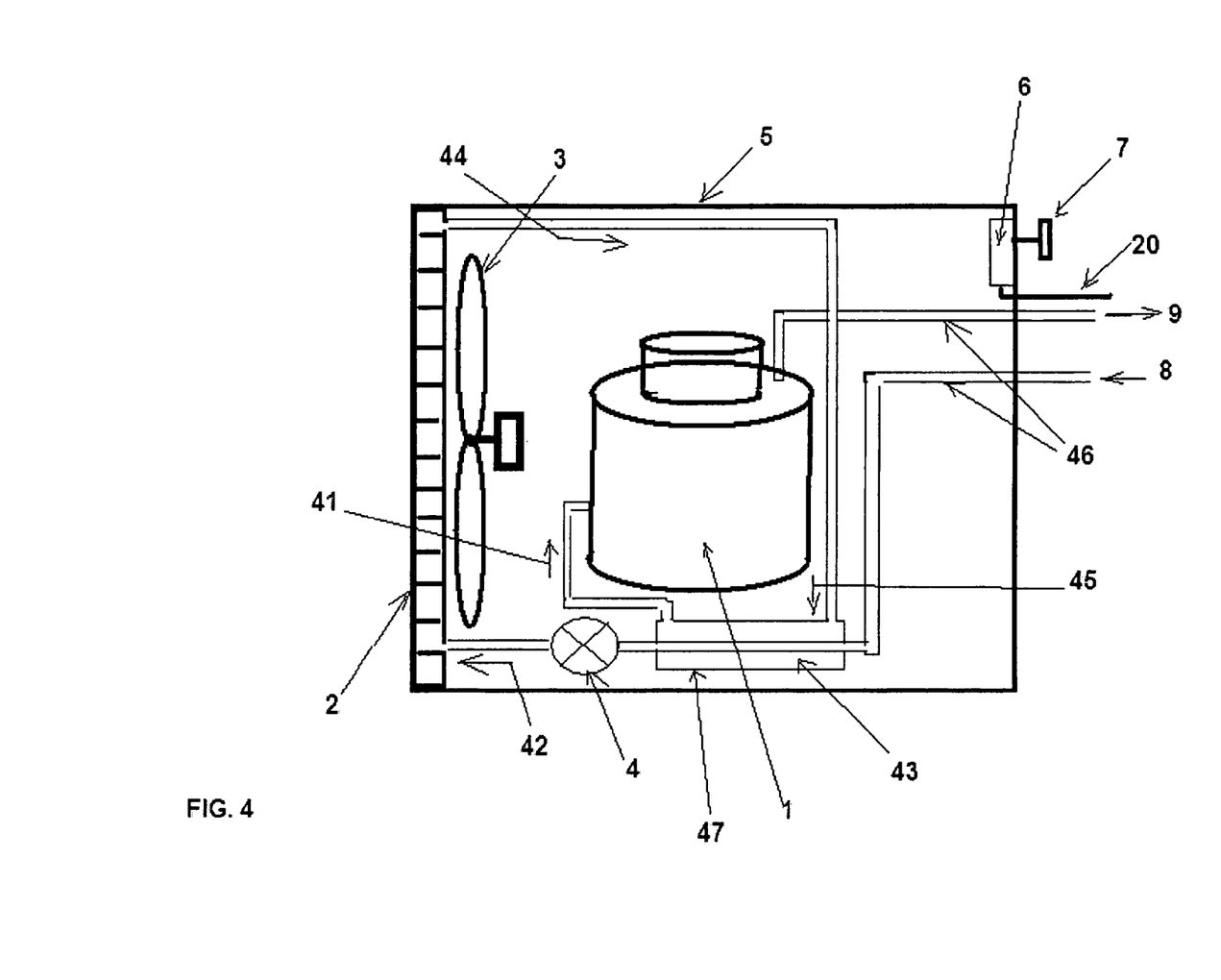
FIG. 4 illustrates an exploded view of the heat pump schematic shown in FIG. 1.

FIG. 4 illustrates an exploded view of the heat pump 5 shown in FIG. 1. The returning refrigerant 8 is carried out from a liquid tank 10 to the expansion device 4. The returning refrigerant 8 passes through the expansion device 4 after it exits the tube-in-tube heat exchanger 47. The expansion device 4 expands and reduces the pressure of the refrigerant. The expansion device 4 can be capillary tube or Automatic Expansion Valve ("AEV") or Thermostatic Expansion Valve ("TEV") or Electric or Electronic Expansion Valves ("EXV") or other known type of expansion device.

After expansion, the refrigerant flows into the evaporator 2 equipped with a fan 3 and exits at a high enthalpy and a low pressure. In the evaporator 2, the refrigerant absorbs heat from surrounding air thereby heating the refrigerant. The flow of the surrounding air is aided by the fan 3 such that the surrounding air exchanges heat with the refrigerant passing through the evaporator 2. The temperature difference between the surrounding air and the refrigerant in the evaporator 2 drives the thermal energy transfer from the surrounding air to the refrigerant as the refrigerant flows through the evaporator 2. The fan 3 moves the surrounding air across the evaporator 2, maintaining the temperature difference and evaporating the refrigerant. The refrigerant 44 and 45 goes through extra superheating in tube-in-tube heat exchanger 47 then reenters the compressor 1, completing the cycle.

The heating capacity of a compressor 1 is defined as the capacity of the compressor 1 to heat the liquid 11 in the liquid tank 10. The heat pump 5 can include an auxiliary electric heater in another embodiment that can further heat the liquid 12 exiting the liquid tank 10 to increase the heating capacity of the heat pump 5. The auxiliary electric heater can be located anywhere on the liquid line exiting the liquid tank 10. The auxiliary heating element can also be the existing one with the typical electrical liquid tank or new one may be attached anywhere in the body of the tank. The auxiliary electric heater can be activated to further heat the liquid 12 exiting the liquid tank 10 when the heating capacity of the heat pump 5 does not meet demand. The auxiliary electric heater can also be activated using cold-temperature thermostat for freezing cold air conditions or activated when there is excess demand of hot liquid.

Further to the description of the heat pump 5 with respect to FIG. 1, a heat recovery heat exchanger 47 (also referred to as an economizer) adds to increasing the efficiency of the HPLH of the present invention. The reason for this is that most of the latent heat in returning refrigerant 8 is normally lost in the expansion process, however, according to one embodiment of the present invention, a substantial portion of the latent heat in the returning refrigerant 8 is recovered and transferred to refrigerant 41 as "superheat". The recovery and use of this additional heat increases the efficiency of the HPLH of the present invention. The heat exchanger 47 can be a tube-in-tube heat exchanger and can be substituted with any other heat exchanger in the system.

In the evaporator 2, the refrigerant absorbs heat from surrounding air thereby heating the refrigerant. The flow of the surrounding air is aided by the fan 3 such that the surrounding air exchanges heat with the refrigerant passing through the evaporator 2 in a known manner. The temperature difference between the surrounding air and the refrigerant in the evaporator 2 drives the thermal energy transfer from the surrounding air to the refrigerant as the refrigerant flows through the evaporator 2. The fan 3 moves the surrounding air across the evaporator 2, maintaining the temperature difference and evaporating the refrigerant. Refrigerant 44 extracts heat from air in the evaporator 2 and then reenters the compressor 1 by first passing through the heat exchanger 43 for superheating the refrigerant to a superheated refrigerant 45.

Figure 5:
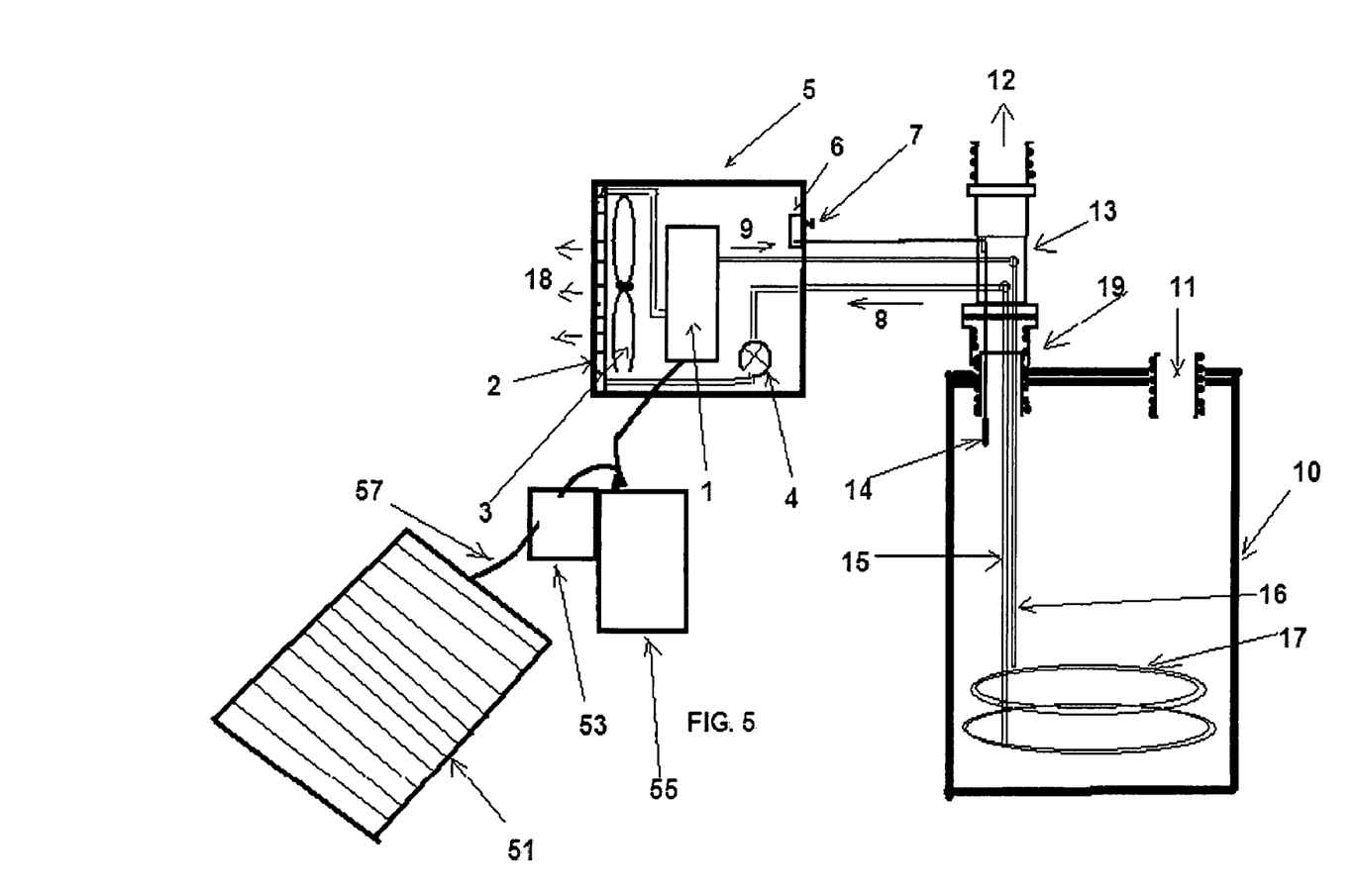
FIG. 5 illustrates a schematic diagram of an HPLH including a solar power source.

FIG. 5 illustrates a preferred embodiment of the present invention and shows a schematic diagram of a heat pump water heating system including a solar power source. The various components and functions have been described herein above with respect to FIG. 1, except FIG. 5 electrical energy input is from solar energy rather than a traditional electric source. Solar energy is inputted to the compressor 1 from a storage battery 55 that stores solar energy. A solar photovoltaic panel 51 collects solar energy this collected solar energy is transferred to a solar charge controller 53 for the storage battery 55 via a connecting wire 57. HPLH system can run directly from batteries or thought an alternating current inverter depending on the electrical requirement of the components of HPLH.

Solar energy can be used to power the auxiliary electric heater, the economizer, and/or any other component requiring electricity. The conversion of solar energy to thermal or electrical energy through the use of systems such as photovoltaic arrays, passive absorbers of solar energy, solar furnaces, trough concentrating collectors with sun trackers is well established in the art. U.S. Pat. No. 4,315,163 describes a multipower electrical system for supplying electrical energy to a house including a solar photovoltaic array, a battery charger and DC to AC inverter. U.S. Pat. No. 4,147,157 describes an active solar energy system comprising an array of solar collectors for both generating power for a pump and for heating a liquid, a pumping device powered by the array to circulate the heated liquid and a storage tank to contain the heated liquid. Similarly, U.S. Pat. No. 5,293,447 describes a system for heating water using solar energy comprising a photovoltaic array, a water heater and a controller. Systems have also been proposed for simultaneously converting solar energy to thermal and electrical. For example, U.S. Pat. No.

4,392,008 describes a flat plated solar thermal collector below and in spaced conductive relationship to a plate-mounted array of photovoltaic cells. U.S. Pat. No. 5,522,944 describes an apparatus with an array of photovoltaic cells and a plurality of interconnected heat collecting tubes disposed on the same plane with the array.

Figure 6A:
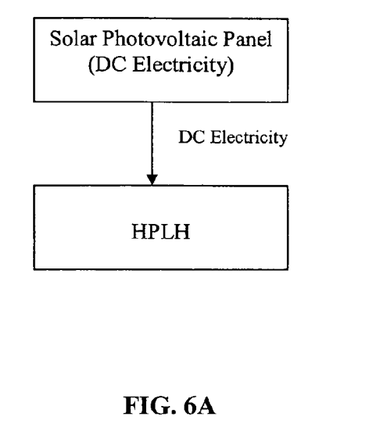
FIG. 6A shows a flowchart of traditional supply of solar energy to an HPLH and FIG. 6B shows a flowchart of supplying solar energy to an HPLH according to one embodiment of the present invention
Figure 6B:
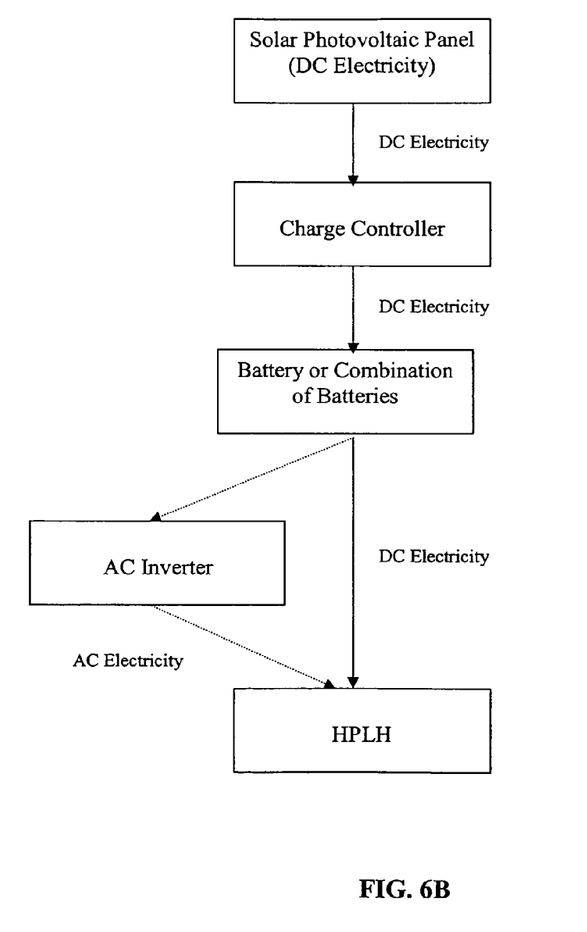

FIG. 6A shows a flowchart of how solar energy is traditionally supplied to an HPLH. First, a solar photovoltaic panel collects solar energy in the form of DC electricity. This DC electricity is then directly supplied to an HPLH. FIG. 6B shows a flowchart of supplying solar energy to an HPLH according to one embodiment of the present invention. Solar energy is collected by a solar photovoltaic panel in the form of DC electricity. The DC electricity is stored in an electricity storage device such as a rechargeable battery or a combination of such batteries using a charge controller. The DC electricity stored in the battery or combination of batteries can then be supplied on demand directly to an HPLH or can first be converted into AC electricity using an inverter before being supplied on demand to the HPLH. The use of a battery or a combination of batteries to store collected solar energy enables the HPLH to have a substantially consistent availability of electricity to power the HPLH. Moreover, when the HPLH is not in use the battery or combination of batteries can store the collected power until the HPLH is in use again. Similarly, stored solar energy enables the HPLH to be used substantially consistently during heavy use.

Further, the heating efficiency of the HPLH is improved by recovering heat from the returning refrigerant from the condenser. The returning refrigerant from the condenser has equal or higher temperature than the liquid in the liquid tank. The heat in the returning refrigerant is traditionally lost during an expansion process. However, the HPLH of the present invention recovers this heat by the heat exchanger (i.e., economizer) or by using any other type of heat exchanger, wherein heat from the returning refrigerant is transferred to the refrigerant going into the compressor.

Moreover, according to one embodiment, a retrofitting method is disclosed. In the retrofitting method the HPLH of the present invention can be used with a portable air conditioning (heating or cooling) unit available in the market. Such retrofitting can be achieved by first either removing the evaporator coil or condenser coil from the air conditioning unit and the remaining coil can be used as the evaporator of the HPLH. Second, the bundled condenser tube is attached at one end to the high pressure opening of the compressor and the other end of the condenser tube is attached to the existing expansion device of the system such that the middle portion of the condenser tube is inserted into the liquid tank and is immersed into the liquid. Third, the expansion device can be attached on the other end to an evaporator with an existing fan. Fourth, the other end of the evaporator can be attached to a low pressure end of a compressor making the system a closed cycle. Optionally, as a fifth step, the cold temperature thermostat switch can be removed and instead a high temperature thermostat switch can be added to the circuit for complete on/off switch capability of the system. The thermostat can be an immersion type or a traditional thermostat attached to the outside wall of the tank. An air filter can be attached on air inlet vents of the retrofitted HPLH.

In another embodiment, the HPLH of the present invention can be used for retrofitting onto commercial air conditioning units. The condenser unit with compressor, expansion device and fan is used as evaporator in commercial HPLH. The tube connections are changed so that one end of condenser tube is connected to the high pressure opening of the compressor. Condenser tube is inserted through the opening of the liquid tank and is immersed in liquid. The other end of the condenser is attached to the existing expansion device of the system. The expansion device is attached to one end of evaporator with the existing fan. The other end of the evaporator is attached to the low pressure end of compressor making the system a closed cycle. The cold temperature thermostat switch is removed and instead a high temperature thermostat switch is added to the circuit for complete on/off of the system. The thermostat is preferably immersion type. An air filter can be attached on air inlet vents of the system.

Although air surrounding the HPLH generally contains enough heat to allow efficient operation of the HPLH, there can be occasions when the wet bulb air temperature approaches freezing, in which case frost begins to form on the evaporator. In such an event the HPLH can become inefficient. In one embodiment, an electric heater can be used to heat the air going through the evaporator causing defrosting which substantially removes any blockage caused by the frost. In another embodiment, the evaporator can be heated directly by an electric heater to defrost the evaporator and thereby substantially remove any blockage caused by the frost. In another embodiment, a low temperature thermostat can be added to the evaporator of the HPLH so that the thermostat can sense the formation of frost on the evaporator and a control means can be automatically activated when the frost is sensed so as to defrost the evaporator by switching on the electric heater. Similarly, the control means can turn the heater off when the defrosting is completed as sensed by the thermostat. See, for example, U.S. Pat. No. 4,517,807 for further information regarding defrosting an evaporator using a thermostat and a control means.

Further, the HPLH improves heating efficiency, saves space, reduces system and installation costs, removes need of liquid circulating pump and its controllers, reduces the maintainable parts in the system and is easy to install. The HPLH can be added to an existing liquid tank or can be integrated with a new liquid tank. Furthermore, altering the length of the condenser aids in tailoring the use of the HPLH for smaller-scale residential use as well as for larger-scale commercial use.

All the above embodiments of HPLH are further enhanced to use adaptors to channel inlet air flow and outlet cool air flow to desired space for air conditioning.

All the above embodiment of HPLH includes a drain hole and tube attachment for the removal of condensate from the evaporator.

Performance data of the heat pump system shown in FIG. 1 for heating water using traditional electricity to power the system is provided herein below in Table 1:

| Ambient Temperature (° F.) | Energy Factor ("EF") |
|---|---|
| 30 | 1.86 |
| 32 | 1.93 |
| 68 | 3.00 |
| 69 | 3.13 |
| 71 | 3.35 |
| 78 | 3.47 |
| 80 | 3.67 |
| 83 | 3.67 |
| 88 | 3.80 |

Figure 7:
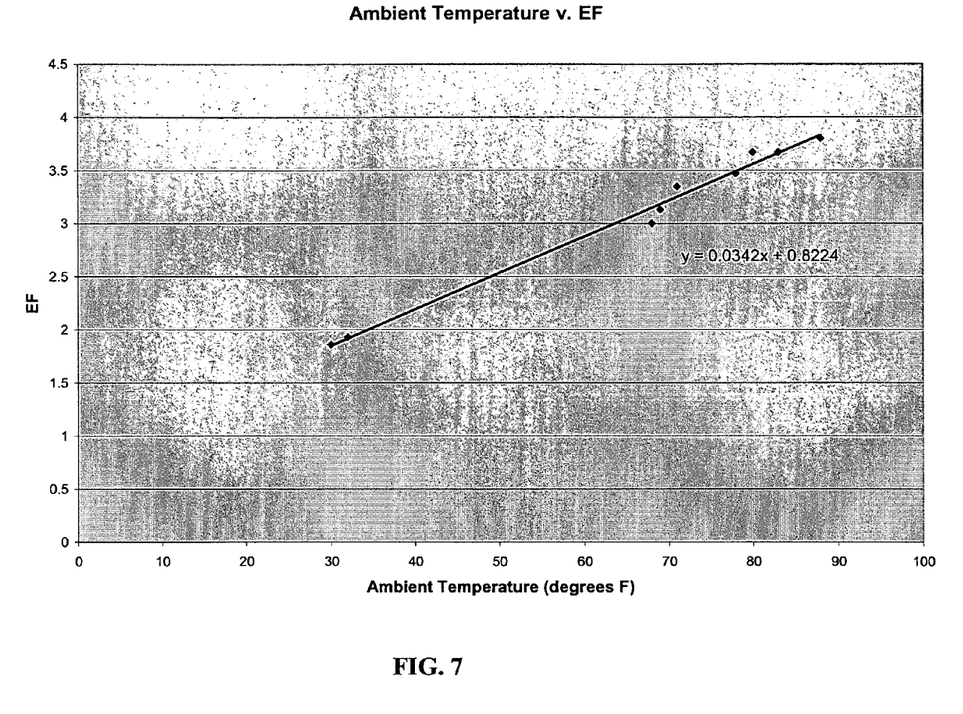
FIG. 7 illustrates a scatter plot of ambient temperature versus a heat pump water heating system's energy factor.

The refrigerant is R22. The Energy Factor ("EF") in the above table is defined as the ratio of heat output to energy input divided by conventional electrical liquid heater efficiency factor. Conventional electric resistance water heater efficiency factor is 0.86. A scatter plot of the above data is shown in FIG. 7 with a trendline. The higher the EF, the more efficient the water heater, and therefore FIG. 7 shows that the efficiency of the water heater increases as the ambient temperature of the water increases.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All of the above-mentioned references are herein incorporated by reference in their entirety to the same extent as if each individual reference was specifically and individually indicated to be incorporated herein by reference in its entirety.

What is claimed is:

1. A heat pump liquid heater for heating a liquid comprising:
   a heat pump;
   a liquid tank in heat communication with the heat pump, wherein the liquid tank comprises the liquid; and
   at least one metal condenser tube immersed into the liquid, wherein the metal condenser tube comprises a refrigerant and is connected to the heat pump, and wherein the metal condenser tube is immersed into the liquid via an adaptor assembly, wherein the adaptor assembly comprises:
      a metal nipple fixedly attached to an opening in a liquid tank;
      a metal union fixedly attached onto the metal nipple; and
      a metal tube fixedly attached to the metal union,
      wherein the metal receives the at least one condenser tube and a thermostat bulb.

2. The heat pump liquid heater of claim 1, wherein the adaptor assembly is fixedly attached to the liquid rank forming a substantially air tight and water tight connection between the heat pump and the liquid tank.

3. The heat pump liquid heater of claim 1, wherein the metal condenser tube is a single continuous coiled tube.

4. The heat pump liquid heater of claim 1, wherein the metal condenser tube has a flattened double-tube configuration and a cross-section defined by concentric ovals such that at least a portion of the concentric ovals is in contact with one another thereby minimizing space between the flattened double-tubes.

5. The heat pump liquid heater of claim 1, wherein the adaptor assembly is retrofitted onto a preexisting liquid tank and/or an air conditioning unit thereby forming a substantially air tight and water tight connection between the heat pump and the preexisting liquid tank and/or air conditioning unit.

6. The heat pump liquid heater of claim 1, wherein the heat pump comprises a tube-in-tube heat exchanger and a compressor, wherein the tube-in-tube heat exchanger recovers heat from refrigerant returning from the liquid tank and transfers the recovered heat to refrigerant going to the compressor thereby superheating the refrigerant.

7. The heat pump liquid heater of claim 1, wherein the compressor is powered by a solar energy source and/or a traditional electric source.

8. The heat pump liquid heater of claim 7, wherein the solar energy source is derived from a solar photovoltaic panel.

9. The heat pump liquid heater of claim 8, wherein the power collected by the solar photovoltaic panel is DC electricity which is stored in at least one rechargeable battery via a charge controller and the stored DC electricity is supplied on demand from the at least one battery to the heat pump liquid heater.

10. The heat pump liquid heater of claim 8, wherein the power collected by the solar photovoltaic panel is DC electricity which is stored in at least one rechargeable battery via a charge controller, the DC electricity is converted into AC electricity via an inverter, and the AC electricity is supplied on demand to the heat pump liquid heater.

11. The heat pump liquid heater of claim 1, wherein the heat pump further comprises a thermostat with a knob, wherein the knob is adjusted by a user to obtain a predetermined temperature of the liquid.

12. The heat pump liquid heater of claim 1, wherein the metal condenser tube is a single continuous coiled tube.

13. The heat pump liquid heater of claim 12, wherein the metal condenser tube has a length of from about 1 ft to about 250 ft.

14. The beat pump liquid heater of claim 13, wherein the metal condenser tube has a length of from about 10 ft to about 100 ft.

15. The heat pump liquid beater of claim 12, wherein the metal condenser tube has a diameter of from about 0.01 inches to about 0.50 inches.

16. The heat pump liquid heater of claim 15, wherein the metal condenser tube has a diameter of about 3/16 inches.

17. The heat pump liquid heater of claim 12, wherein the metal condenser tube has a thickness of about 0.035 inches.

18. The heat pump liquid heater of claim 12, wherein the metal condenser tube is made of copper.

19. The heat pump liquid heater of claim 12, wherein the metal condenser tube is flexible.

20. The heat pump liquid heater of claim 12, wherein the metal condenser tube has a length and diameter to heat the liquid to a predetermined temperature in a predetermined time period.

21. The heat pump liquid heater of claim 12, wherein the metal condenser tube has a surface area to heat the liquid to a predetermined temperature in a predetermined time period.

22. The heat pump liquid heater of claim 12, wherein the metal condenser tube has a whisk configuration with multiple smaller diameter condenser tubes emerging from the metal condenser tube, wherein the smaller diameter condenser tubes form coils.

23. The heat pump liquid heater of claim 1, wherein the refrigerant is selected from the group consisting of carbon dioxide, hydrofluorocarbons, and hydrochlorofluorocarbons.

24. The heat pump liquid heater of claim 1, wherein liquid is water.

* * * * *